(12) United States Patent
Zhao et al.

(10) Patent No.: US 11,917,202 B2
(45) Date of Patent: Feb. 27, 2024

(54) METHOD AND APPARATUS FOR FREQUENCY-DEPENDENT JOINT COMPONENT SECONDARY TRANSFORM

(71) Applicant: TENCENT AMERICA LLC, Palo Alto, CA (US)

(72) Inventors: Xin Zhao, San Diego, CA (US); Madhu Peringassery Krishnan, Mountain View, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 318 days.

(21) Appl. No.: 17/495,202

(22) Filed: Oct. 6, 2021

(65) Prior Publication Data
US 2022/0030275 A1    Jan. 27, 2022

Related U.S. Application Data

(63) Continuation of application No. 16/928,760, filed on Jul. 14, 2020, now Pat. No. 11,206,428.

(51) Int. Cl.
*H04N 19/61* (2014.01)
*H04N 19/176* (2014.01)

(52) U.S. Cl.
CPC ........... *H04N 19/61* (2014.11); *H04N 19/176* (2014.11)

(58) Field of Classification Search
CPC .............................. H04N 19/61; H04N 19/176
USPC .................................................... 375/240.18
See application file for complete search history.

(56) References Cited

U.S. PATENT DOCUMENTS

| | | | |
|---|---|---|---|
| 8,238,442 | B2 | 8/2012 | Liu |
| 8,526,495 | B2 | 9/2013 | Liu et al. |
| 9,049,452 | B2 | 6/2015 | Liu et al. |
| 9,788,019 | B2 | 10/2017 | Liu et al. |
| 10,404,980 | B1 | 9/2019 | Zhao et al. |
| 10,419,754 | B1 | 9/2019 | Zhao et al. |
| 10,432,929 | B2 | 10/2019 | Zhao et al. |
| 10,462,486 | B1 | 10/2019 | Zhao et al. |
| 10,491,893 | B1 | 11/2019 | Zhao et al. |
| 10,536,720 | B2 | 1/2020 | Zhao et al. |
| 10,547,854 | B2 | 1/2020 | Seregin et al. |
| 10,567,801 | B2 | 2/2020 | Zhao et al. |
| 10,609,384 | B2 | 3/2020 | Chen et al. |

(Continued)

OTHER PUBLICATIONS

Extended European Search Report dated Apr. 24, 2023 in European Application No. 21842772.2.

(Continued)

*Primary Examiner* — Nguyen T Truong
(74) *Attorney, Agent, or Firm* — Sughrue Mion, PLLC

(57) ABSTRACT

A method and apparatus for performing a frequency-dependent joint component secondary transform (FD-JCST). The method includes obtaining a plurality of transform coefficients in a transform coefficient block; determining whether at least one of the plurality of transform coefficients is a low-frequency coefficient; based on determining that the at least one of the plurality of transform coefficients is the low-frequency coefficient, determining whether the low-frequency coefficient is a non-zero value; and based on determining that the low-frequency coefficient is the non-zero value, performing a joint component secondary transform (JCST) on the low-frequency coefficient and signaling a related syntax to indicate that the JCST is performed.

20 Claims, 10 Drawing Sheets

(56) References Cited

U.S. PATENT DOCUMENTS

| | | | |
|---|---|---|---|
| 10,609,402 | B2 | 3/2020 | Zhao et al. |
| 2005/0078869 | A1 | 4/2005 | Kim |
| 2013/0182758 | A1 | 7/2013 | Seregin et al. |
| 2014/0198857 | A1 | 7/2014 | Deshpande |
| 2017/0094314 | A1 | 3/2017 | Zhao et al. |
| 2018/0302631 | A1 | 10/2018 | Chiang et al. |
| 2019/0373276 | A1 | 12/2019 | Hu et al. |
| 2020/0396487 | A1 | 12/2020 | Nalci et al. |
| 2021/0120252 | A1 | 4/2021 | Koo et al. |

OTHER PUBLICATIONS

Jianle Chen et al., "Algorithm description for Versatile Video Coding and Test Model 9 (VTM 9)", Joint Video Experts Team (JVET) of ITU-T SG 16 WP 3 and ISO/IEC JTC 1/SC 29/WG 11, JVET-R2002-v2, Apr. 15-24, 2020, 18th Meeting: by teleconference (97 pages total).

Christian Rudat et al., "Inter-Component Transform for Color Video Coding", 2019 Picture Coding Symposium (PCS) ,IEEE, Nov. 12-15, 2019, pp. 1-5 (5 pages total).

International Search Report dated Aug. 24, 2021 in International Application No. PCT/US2021/031944.

Written Opinion of the International Searching Authority dated Aug. 24, 2021 in International Application No. PCT/US2021/031944.

Shan Liu et al., "Bit-depth Scalable Coding for High Dynamic Range Video", SPIE-IS&T Electronic Imaging, 2008, vol. 6822, pp. 1-10 (10 pages total).

Dong Liu et al., "Deep Learning-Based Technology in Responses to the Joint Call for Proposals on Video Compression with Capability beyond Hevc", IEEE Transactions on Circuits and Systems for Video Technology, 2019, pp. 1-14 (14 pages total).

Shan Liu et al., "JVET AHG Report: Neural Networks in Video Coding (AHG9)", Joint Video Experts Team (JVET) of ITU-T SG 16 WP 3 and ISO/IEC JTC 1/SC 29/WG 11, 10th Meeting: San Diego, US, Apr. 10-20, 2018, JVET-J0009-v1, pp. 1-3 (3 pages total).

Yiming Li et al., "Methodology and reporting template for neural network coding tool testing", Joint Video Experts Team (JVET) of ITU-T SG 16 WP 3 and ISO/IEC JTC 1/SC 29/WG 11, 13th Meeting: Marrakech, MA, Jan. 9-18, 2019, JVET-M1006-v1, pp. 1-6 (6 pages total).

Benjamin Bross et al., "Versatile Video Coding (Draft 6)", Joint Video Experts Team (JVET) of ITU-T SG 16 WP 3 and ISO/IEC JTC 1/SC 29/WG 11, 15th Meeting: Gothenburg, SE, Jul. 3-12, 2019, JVET-O2001-vE (455 pages).

De Rivaz et al., "AV1 Bitstream & Decoding Process Specification", Version 1.0.0 with Errata 1, 2018, The Alliance for Open Media, https://aomediacodec.github.io/av1-spec/av1-spec.pdf (681 pages total).

Bross et al., "Versatile Video Coding (Draft 2)", Joint Video Experts Team (JVET) of ITU-T SG 16 WP 3 and ISO/IEC JTC 1/SC 29/WG 11, 11th Meeting: Ljubljana, SI, Jul. 10-18, 2018, JVET-K1001-v6 (141 pages total).

Racape et al., "CE3-related: Wide-angle intra prediction for non-square blocks", Joint Video Experts Team (JVET) of ITU-T SG 16 WP 3 and ISO/IEC JTC 1/SC 29/WG 11, 11th Meeting: Ljubljana, SI, Jul. 10-18, 2018, JVET-K0500_r1, r2, r3 and r4 (45 pages total).

Bross et al., "CE3: Multiple reference line intra prediction (Test 1.1.1, 1.1.2, 1.1.3 and 1.1.4)", Joint Video Experts Team (JVET) of ITU-T SG 16 WP 3 and ISO/IEC JTC 1/SC 29/WG 11, 12th Meeting: Macao, CN, Oct. 3-12, 2018, JVET-L0283-v2 (7 pages total).

X. Zhao et al., "Novel Statistical Modeling, Analysis and Implementation of Rate-Distortion Estimation for H.264/AVC Coders," in IEEE Transactions on Circuits and Systems for Video Technology, vol. 20, No. 5, pp. 647-660, May 2010 (14 pages total).

B. Bross et al., "General Video Coding Technology in Responses to the Joint Call for Proposals on Video Compression with Capability beyond HEVC," in IEEE Transactions on Circuits and Systems for Video Technology, 2019, pp. 1-16 (16 pages total).

Zhao et al., "CE6: On 8-bit primary transform core (Test 6.1.3)", Joint Video Experts Team (JVET) of ITU-T SG 16 WP 3 and ISO/IEC JTC 1/SC 29/WG 11, 12th Meeting: Macao, CN, Oct. 3-12, 2018, JVET-L0285 (35 pages total).

L. Zhao et al., "Wide Angular Intra Prediction for Versatile Video Coding," 2019 Data Compression Conference (DCC), Snowbird, UT, USA, 2019, pp. 53-62 (10 pages total).

Y.-J. Chang et al., "Intra prediction using multiple reference lines for the versatile video coding standard," Proc. SPIE 11137, Applications of Digital Image Processing XLII, 1113716, Sep. 2019 (8 pages total).

Zhao et al., "CE6: Fast DST-7/DCT-8 with dual implementation support (Test 6.2.3)", Joint Video Experts Team (JVET) of ITU-T SG 16 WP 3 and ISO/IEC JTC 1/SC 29/WG 11, 13th Meeting: Marrakech, MA, Jan. 9-18, 2019, JVET-M0497 (11 pages total).

Zhao et al., "CE6-related: Unified LFNST using block size independent kernel", Joint Video Experts Team (JVET) of ITU-T SG 16 WP 3 and ISO/IEC JTC 1/SC 29/WG 11, 15th Meeting: Gothenburg, SE, Jul. 3-12, 2019, JVET-O0539-v2 (19 pages total).

S. Liu et al., "Joint temporal-spatial bit allocation for video coding with dependency," in IEEE Transactions on Circuits and Systems for Video Technology, vol. 15, No. 1, pp. 15-26, Jan. 2005 (12 pages total).

X. Zhao et al., "NSST: Non-Separable Secondary Transforms for Next Generation Video Coding," in Proc. Picture Coding Symposium, 2016 (5 pages total).

X. Zhao et al., "Joint separable and non-separable transforms for next-generation video coding," IEEE Transactions on Image Processing, vol. 27, No. 5, pp. 2514-2525, May 2018 (13 pages total).

X. Zhao et al., "Coupled Primary and Secondary Transform for Next Generation Video Coding," 2018 IEEE Visual Communications and Image Processing (VCIP), Taichung, Taiwan, 2018, pp. 1-4 (4 pages total).

Z. Zhang et al., "Fast Adaptive Multiple Transform for Versatile Video Coding," 2019 Data Compression Conference (DCC), Snowbird, UT, USA, 2019, pp. 63-72 (10 pages total).

X. Zhao et al., "Low-Complexity Intra Prediction Refinements for Video Coding," 2018 Picture Coding Symposium (PCS), San Francisco, CA, 2018, pp. 139-143 (5 pages total).

Z. Zhang et al., "Fast DST-7/DCT-8 with Dual Implementation Support for Versatile Video Coding," in IEEE Transactions on Circuits and Systems for Video Technology, 2020, pp. 1-17 (17 pages total).

Zhao et al., "Non-CE6: Configurable max transform size in VVC", Joint Video Experts Team (JVET) of ITU-T SG 16 WP 3 and ISO/IEC JTC 1/SC 29/WG 11, 15th Meeting: Gothenburg, SE, Jul. 3-12, 2019, JVET-O0545-v2 (6 pages total).

Computer 1000

METHOD AND APPARATUS FOR FREQUENCY-DEPENDENT JOINT COMPONENT SECONDARY TRANSFORM

CROSS-REFERENCE TO RELATED APPLICATIONS

This application is a continuation of U.S. patent application Ser. No. 16/928,760, filed on Jul. 14, 2020, in the United States Patent and Trademark Office, the disclosure of which is incorporated herein by reference in its entirety.

BACKGROUND

1. Field

The disclosure relates to the field of advanced video coding, and in particular, to a method of performing a frequency-dependent joint component secondary transform (FD-JCST) on transform coefficients of multiple color components.

2. Description of Related Art

In video compression technology, devices such as computers, televisions, mobile terminals, digital cameras, etc. are configured to encode and decode image and video information to compress video data and transmit the compressed video data at a faster rate over network. Specifically, in video compression, spatial prediction (intra-prediction) and temporal prediction (inter-prediction) are used to reduce or remove redundancy in video frames. A video frame or a portion of a video frame may be partitioned into video blocks, which are referred to as Coding Units (CUs). Here, each CU may be encoded using spatial prediction with respect to reference samples in neighboring blocks in the same video frame or using temporal prediction with respect to reference samples in other reference video frames. Spatial prediction and temporal prediction results in a predictive block for a block to be coded. Residual data represents pixel differences between the original block to be coded and the predictive block. The residual data may be transformed from the pixel domain to a transform domain to obtain residual transform coefficients. In Versatile Video Coding (VVC) and other predecessor standards, the block-based video coding employs skipping the transform stage of the prediction residual due to the different residual signal characteristics. The following describes examples of transform skipping in residual coding in AV1 and VVC.

AOMedia Video 1 (AV1) is an open video coding format designed for video transmissions over the Internet. It was developed as a successor to VP9 by the Alliance for Open Media (AOMedia), a consortium founded in 2015 that includes semiconductor firms, video on demand providers, video content producers, software development companies and web browser vendors. Many of the components of the AV1 project were sourced from previous research efforts by Alliance members. Individual contributors started experimental technology platforms years before: Xiph's/Mozilla's Daala was published code in 2010, Google's experimental VP9 evolution project VP10 was announced on 12 Sep. 2014, and Cisco's Thor was published on 11 Aug. 2015. Building on the codebase of VP9, AV1 incorporates additional techniques, several of which were developed in these experimental formats. The first version 0.1.0 of the AV1 reference codec was published on 7 Apr. 2016. The Alliance announced the release of the AV1 bitstream specification on 28 Mar. 2018, along with a reference, software-based encoder and decoder. On 25 Jun. 2018, a validated version 1.0.0 of the specification was released. On 8 Jan. 2019 a validated version 1.0.0 with Errata 1 of the specification was released. The AV1 bitstream specification includes a reference video codec. The specification of AV1 standard available at https://aomediacodec.github.io/av1-spec/av1-spec.pdf.

In AV1 residual coding, for each transform unit, AV1 coefficient coder starts with coding a skip sign, which will be followed by the transform kernel type and the end-of-block (EOB) position of all non-zero coefficients when the transform coding is not skipped. Then each coefficient value is mapped to multiple level maps and the sign, where the sign plane covers the signs of coefficients and the three level planes correspond to different ranges of coefficient magnitudes, namely lower-level, middle-level and higher-level planes. The lower level plane corresponds to the range of 0-2, the middle level plane corresponds to the range of 3-14, and the higher-level plane covers the range of 15 and above.

After the EOB position is coded, the lower level and middle level planes are coded together in reverse scan order, the former indicating if the coefficient magnitude is between 0 and 2 while the latter indicating if the range is between 3 and 14. Then the sign plane and higher level plane are coded together in forward scan order, and the higher level plane indicates the residual value with a magnitude greater than 14, and the remainder is entropy coded using Exp-Golomb code. AV1 adopts the traditional zig-zag scan order.

Such separation allows one to assign a rich context model to the lower level plane, which accounts for the transform directions: bi-directional, horizontal, and vertical; transform size; and up to five neighbor coefficients for improved compression efficiency, at the modest context model size. The middle level plane uses a context model like the lower level plane with number of context neighbor coefficients being reduced from 5 to 2. The higher-level plane is coded by Exp-Golomb code without using context model. In the sign plane, except that the direct current (DC) sign is coded using its neighbor transform units' DC signs as context information, other sign bits are coded directly without using context model.

In VVC residual coding, the coding block is first split into 4×4 sub-blocks and the sub-blocks inside the coding block and the transform coefficients within a sub-block are coded according to predefined scan orders. For the sub-block with at least one non-zero transform coefficient, the coding of transform coefficients is separated into four scan passes. Suppose absLevel is the absolute value of the current transform coefficient, in the first pass, the syntax elements sig_coeff_flag (which indicates that absLevel is larger than 0), par_level_flag (which indicates the parity of absLevel) and rem_abs_gt1_flag (which indicates (absLevel−1)>>1 is greater than 0) are coded. In the second pass, the syntax element rem_abs_gt2_flag (which indicates that absLevel is greater than 4) is coded. In the third pass, the remaining values (referred to as abs remainder) of coefficient levels are coded, if necessary. In the fourth pass, the sign information is coded.

To exploit the correlation between transform coefficients, the previously coded coefficients, covered by a local template shown in FIG. 1, are used in the context selection for the current coefficients, where the position labeled in black indicates the position of current transform coefficient and positions labeled in light grey indicates its five neighbors. Here, absLevel1[x][y] represents the partially reconstructed absolute levels for coefficient at position (x, y) after the first pass, d represents the diagonal position of the current coefficient (where, d=x+y), numSig represents the number of non-zero coefficients in local template and sumAbs1 represents the sum of partially reconstructed absolute level absLevel1[x][y] for coefficients covered by the local template.

When coding sig_coeff_flag of the current coefficient, the context model index is selected depending on sumAbs1 and diagonal position d. More specifically, for Luma component, the context model index is determined according to:

ctxSig=18*max(0,state−1)+min(sumAbs1,5)+ (*d*<2?12:(*d*<5?6:0)),which is equivalent to the following:

ctxIdBase=18*max(0,state−1)+(*d*<2?12:(*d*<5?6:0)); and ctxSig=ctxIdSigTable[min(sumAbs1,5)]+ctxIdBase.

For Chroma, the context model index is determined according to:

ctxSig=12*max(0,state−1)+min(sumAbs1,5)+(*d*<2?6: 0),which is equivalent to the following:

ctxIdBase=12*max(0,state−1)+(*d*<2?6:0); and ctxSig=ctxIdSigTable[min(sumAbs1,5)]+ctxIdBase.

Here, the "state" specifies the scalar quantizer being used if the dependent quantization is enabled and the state is derived using a state transition process. The table ctxIdSigTable stores the context model index offset, ctxIdSigTable[0~5]={0, 1, 2, 3, 4, 5}.

When coding par_level_flag of the current coefficient, the context model index is selected depending on sumAbs1, numSig and diagonal position d. More specifically, for Luma component, the context model index is determined according to:

ctxPar=1+min(sumAbs1−numSig,4)+(*d*==0?15: (*d*<3?10:(*d*<10?5:0))), which is equivalent to the following:

ctxIdBase=(*d*==0?15:(*d*<3?10:(*d*<10?5:0))); and ctxPar=1+ctxIdTable[min(sumAbs1−numSig,4)]+ ctxIdBase.

For Chroma, the context model index is determined according to:

ctxPar=1+min(sumAbs1−numSig,4)+(*d*==0?5:0), which is equivalent to the following:

ctxIdBase=(*d*==0?5:0); and ctxPar=1+ctxIdTable[min(sumAbs1−numSig,4)]+ ctxIdBase.

Here, the table ctxIdTable stores the context model index offset, ctxIdTable[0~4]={0, 1, 2, 3, 4}.

When coding rem_abs_gt1_flag and rem_abs_gt2_flag of the current coefficient, their context model indices are determined in a manner similar to par_level_flag:

ctxGt1=ctxPar; and ctxGt2=ctxPar.

Different sets of context models are used for rem_abs_gt1_flag and rem_abs_gt2_flag. This means that the context model used for rem_abs_gt1_flag is different from that of rem_abs_gt2_flag, even though ctxGt1 is equal to ctxGt2.

SUMMARY

According to an embodiment, there is provided a method for performing a frequency-dependent joint component secondary transform (FD-JCST), the method includes: obtaining a plurality of transform coefficients in a transform coefficient block; determining whether at least one of the plurality of transform coefficients is a low-frequency coefficient; based on determining that the at least one of the plurality of transform coefficients is the low-frequency coefficient, determining whether the low-frequency coefficient is a non-zero value; and based on determining that the low-frequency coefficient is the non-zero value, performing a joint component secondary transform (JCST) on the low-frequency coefficient and signaling a related syntax to indicate that the JCST is performed.

According to an embodiment, there is provided an apparatus for performing a frequency-dependent joint component secondary transform (FD-JCST) including: at least one memory storing computer program code; and at least one processor configured to access the at least one memory and operate as instructed by the computer program code. The computer program code includes: obtaining code configured to cause the at least one processor to obtain a plurality of transform coefficients in a transform coefficient block; first determining code configured to cause the at least one processor to determine whether at least one of the plurality of transform coefficients is a low-frequency coefficient; second determining code configured to cause the at least one processor to, based on determining that the at least one of the plurality of transform coefficients is the low-frequency coefficient, determine whether the low-frequency coefficient is a non-zero value; and processing code configured to cause the at least one processor to, based on determining that the low-frequency coefficient is the non-zero value, perform a joint component secondary transform (JCST) on the low-frequency coefficient and signaling a related syntax to indicate that the JCST is performed.

According to an embodiment, there is provided a non-transitory computer-readable storage medium, storing at least one instruction, the at least one instruction, when loaded and executed by a processor, the processor is configured to: obtain a plurality of transform coefficients in a transform coefficient block; determine whether at least one of the plurality of transform coefficients is a low-frequency coefficient; based on determining that the at least one of the plurality of transform coefficients is the low-frequency coefficient, determine whether the low-frequency coefficient is a non-zero value; and based on determining that the low-frequency coefficient is the non-zero value, perform a joint component secondary transform (JCST) on the low-frequency coefficient and signaling a related syntax to indicate that the JCST is performed.

BRIEF DESCRIPTION OF THE DRAWINGS

The following description briefly introduces the accompanying drawings, which illustrate example embodiments of the disclosure. These and other aspects, features and advantages will become apparent from the following detailed description of example embodiments, which is to be read in conjunction with the accompanying drawings, in which.

DETAILED DESCRIPTION

Example embodiments are described in detail herein with reference to the accompanying drawings.

Figure 2:
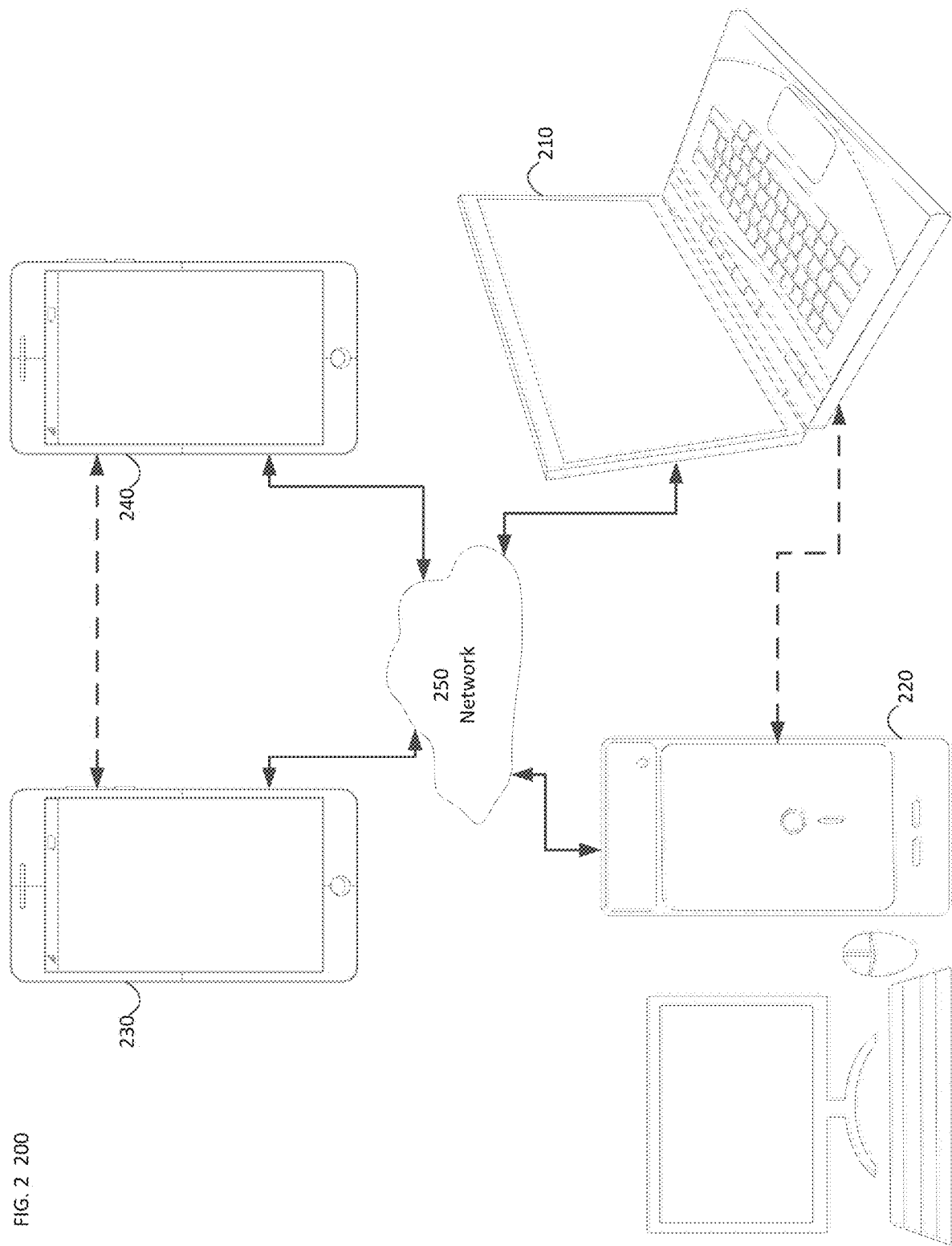
FIG. 2 is a schematic diagram illustrating a communication system according to an embodiment.

FIG. 2 is a schematic diagram illustrating a communication system according to an embodiment.

A communication system 200 may include at least two terminal devices 210 and 220, such as laptop and desktop computer, interconnected via a network 250. For unidirectional transmission of data, a first terminal device 210 may code video data at a local location for transmission to a second terminal device 220 via the network 250. The second terminal device 220 may receive the coded video data of the first terminal via the network 250, decode the video data and display the decoded video data. Unidirectional data transmission may be common in media serving applications and the like. However, the embodiment is not limited hereto. For example, the at least two terminals may include televisions, personal digital assistants (PDAs), tablet computers, e-book readers, digital cameras, digital recording devices, digital media players, video gaming devices, video game consoles, video teleconferencing devices, video streaming devices, and the like.

The communication system 200 may also include other terminal devices such as mobile devices 230 and 240, which may also be connected via the network 250. These terminal devices 230 and 240 may be provided to support bidirectional transmission of coded video that may occur, for example, during video conferencing. For bidirectional transmission of data, each terminal 230 and 240 may code video data captured at a local location for transmission to the other terminal via the network 250. Each terminal may also receive the coded video data transmitted by the other terminal, decode the coded data and display the recovered video data at a local display device.

In addition, the terminals 210 to 240 may be illustrated as servers, personal computers and smart phones, but the embodiments are not limited thereto. The embodiments may include applications with laptop computers, tablet computers, media players and/or dedicated video conferencing equipment. The network 250 may include any number of networks that transmit and receive coded video data, including, for example, wired and/or wireless communication networks. The communication network 250 may exchange data in circuit-switched and/or packet-switched channels. For example, the networks may include telecommunications networks, local area networks, wide area networks and/or the Internet.

Figure 3:
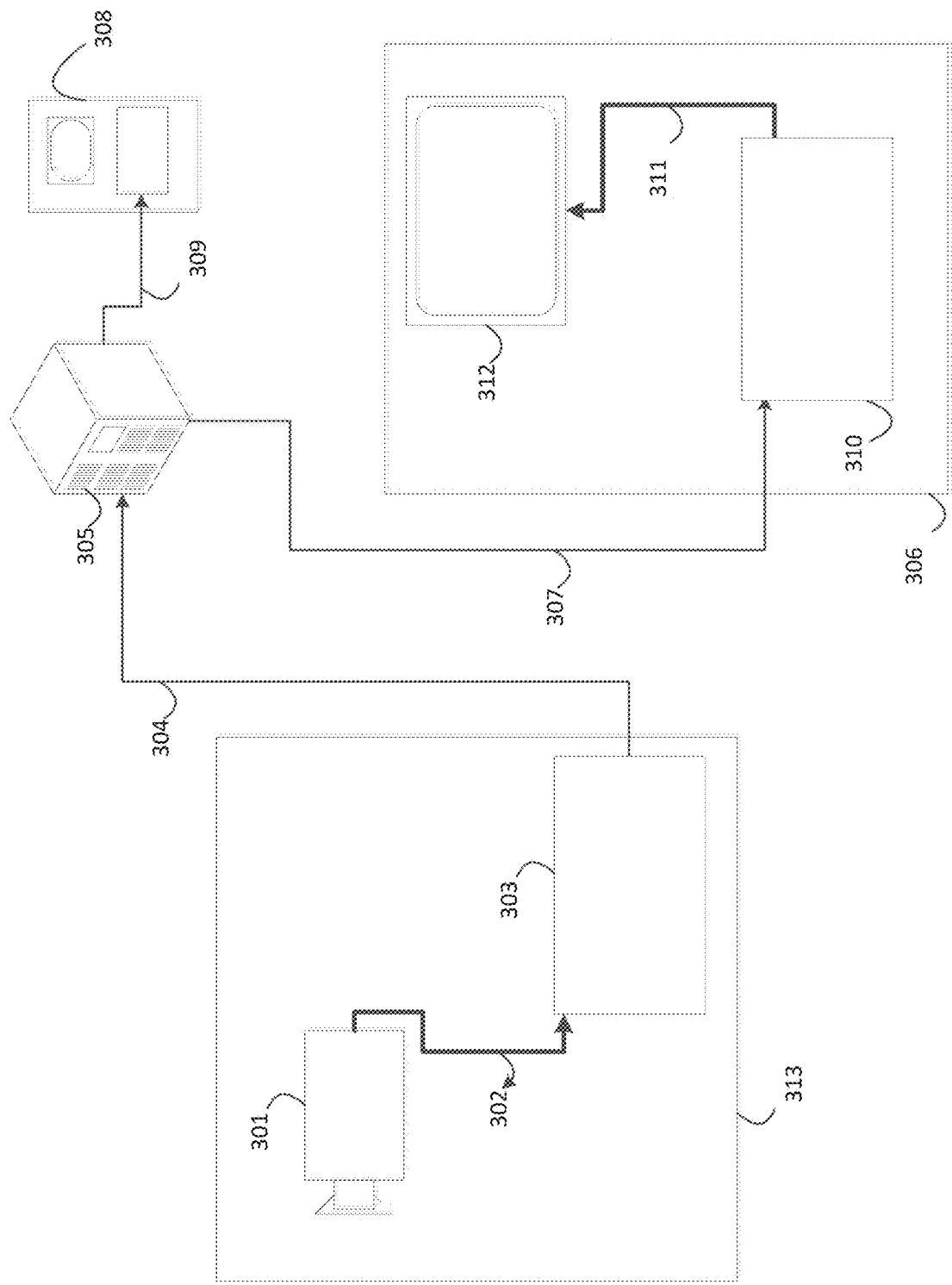
FIG. 3 is a schematic diagram illustrating a video encoder and a video decoder in a streaming environment according to an embodiment.

FIG. 3 is a schematic diagram illustrating a video encoder and a video decoder in a streaming environment according to an embodiment.

A streaming system may include a capture device 313 including a video source 301, for example a digital camera. The capture device 313 may capture an image or video to create an uncompressed video sample stream 302. The sample stream 302 is depicted as a bold line to emphasize a high data volume when compared to encoded video bitstreams, and can be processed by an encoder 303 coupled to the video source 301. The encoder 303 may include hardware, software, or a combination thereof to enable or implement aspects of the embodiments described in more detail below. The encoded video bitstream 304, which is depicted as a thin line to emphasize a lower data volume compared to the sample stream 302, may be stored in a streaming server 305 for later use. One or more streaming clients 306 and 308 may access the streaming server 305 to retrieve copies of the encoded video bitstream 307 and 309. The client 306 may include a video decoder 310 that is configured to decode the incoming copy of the encoded video bitstream 307 and create an outgoing video sample stream 311 that can be rendered on a display 212 or other rendering device. In some embodiments, the video bitstreams 304, 307 and 309 may be encoded according to certain video coding/compression standards, such as ITU-T H.265 (also known as HEVC) and currently under development ITU-T H.266 (also referred to as Future Video Coding (FVC)).

Figure 4:
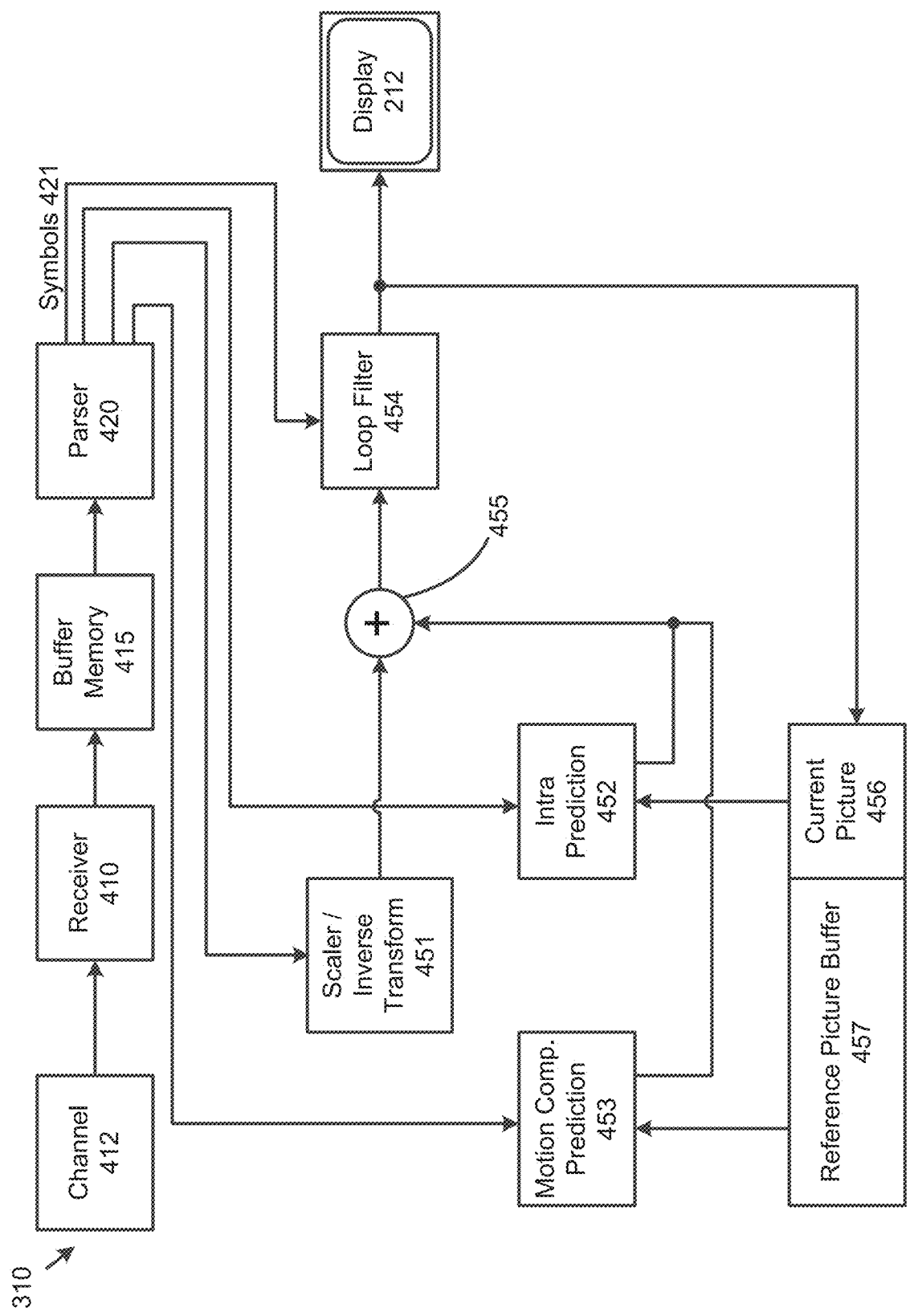
FIG. 4 is a block diagram illustrating a video decoder according to an embodiment.

FIG. 4 is a block diagram illustrating a video decoder according to an embodiment.

A video decoder 310 may include a receiver 410, a buffer memory 415, a parser 420, a loop filter unit 454, an intra prediction unit 452, a scaler/inverse transform unit 451, a reference picture buffer 457 and a motion compensation prediction unit 453.

The receiver 410 receive one or more codec video sequences to be decoded. Here, the receiver 410 may receive one coded video sequence at a time, in which the decoding of each coded video sequence is independent from other coded video sequences. The coded video sequence may be received from a channel 412, which may be a hardware/software link to a storage device that stores the encoded video data. The receiver 410 may receive the encoded video data with other data, for example, coded audio data and/or ancillary data streams, that may be forwarded to their respective using entities. The receiver 410 may separate the coded video sequence from the other data. To combat network jitter, a buffer memory 415 may be coupled in between the receiver 410 and entropy decoder/parser 420 (hereinafter "parser"). When the receiver 410 is receiving data from a storage/forward device or from an isosychronous network at stable bandwidth and controllability, the buffer memory 415 may not be necessary. However, for best use in packet networks, such as the Internet, the buffer memory 415 may be required, and may be configured to reserve comparatively large memory space or may be configured so that the size of the memory can be changed depending on the load on the network.

In addition, the receiver 410 may receive additional (redundant) data of the encoded video. The additional data may be included as part of the coded video sequence(s). The additional data may be used by the video decoder 310 to properly decode the data and/or to more accurately reconstruct the original video data. Additional data can be in the form of, for example, temporal, spatial, or signal-to-noise ratio (SNR) enhancement layers, redundant slices, redundant pictures, forward error correction codes, and so forth.

The parser 420 may be configured to reconstruct symbols 421 from the entropy coded video sequence. Categories of those symbols may include information used to manage operation of the decoder 310, and potentially information to control a rendering device such as a display 212 (shown in FIG. 3) that is not an integral part of the decoder but can be coupled to it. The control information for the rendering device(s) may be in the form of Supplementary Enhancement Information (SEI messages) or Video Usability Information (VUI) parameter set fragments.

The parser 420 may receive coded video sequence from the buffer memory 415 and parse or entropy-decode the received coded video sequence. The coding of the coded video sequence can be in accordance with a video coding technology or standard, and can follow principles well known to a person skilled in the art, including variable length coding, Huffman coding, arithmetic coding with or without context sensitivity, and the like. The parser 420 may extract, from the received coded video sequence, a set of subgroup parameters for at least one of the subgroups of pixels in the video decoder, based on at least one parameter corresponding to the group. Subgroups may include Groups of Pictures (GOPs), pictures, tiles, slices, macroblocks, Coding Units (CUs), blocks, Transform Units (TUs), Prediction Units (PUs) and so forth. The parser 420 may also extract from the coded video sequence information such as transform coefficients, quantizer parameter (QP) values, motion vectors, and so forth.

The parser 420 may perform parsing operation on the received coded video sequence from the buffer 415 to create symbols 421. The parser 420 may receive encoded data, and selectively decode particular symbols 421. Further, the parser 420 may determine where to provide the symbols 421. That is, the parser 420 may determine whether to provide the symbols 421 to a loop filter unit 454, a Motion Compensation Prediction unit 453, a scaler/inverse transform unit 451 and/or an Intra Prediction unit 452.

Reconstruction of the symbols 421 may involve multiple different units depending on the type of the coded video picture or parts thereof (such as, inter and intra picture, inter and intra block, and other factors). The parser 420 determines which units are involved and controls based on the subgroup control information that is parsed from the coded video sequence. The flow of such subgroup control information between the parser 420 and the multiple units is not depicted.

Furthermore, the decoder 310 may be conceptually subdivided into a number of functional units. In a practical implementation operating under commercial constraints, many of these units interact closely with each other and may, at least partly, be integrated into each other.

The scaler/inverse transform unit 451 may be configured to receive quantized transform coefficients as well as control information, including which transform to use, block size, quantization factor, quantization scaling matrices, etc. as the symbol 421 from the parser 420. The scaler/inverse transform unit 451 may output blocks including sample values to an aggregator 455.

In some cases, the output samples of the scaler/inverse transform 451 may be an intra coded block. That is, a block that is not using predictive information from previously reconstructed pictures, but using predictive information from previously reconstructed parts of the current picture. Such predictive information may be provided by an intra picture prediction unit 452. In some cases, the intra picture prediction unit 452 may generate a block of the same size and shape of the block under reconstruction, using surrounding already reconstructed information fetched from the current (partly reconstructed) picture 456. The aggregator 455, in some cases, adds, on a per sample basis, the prediction information that the intra prediction unit 452 generates as the output sample information provided by the scaler/inverse transform unit 451.

In other cases, the output samples of the scaler/inverse transform unit 451 may be an inter coded block, and potentially a motion compensated block. In such case, a Motion Compensation Prediction unit 453 may access the reference picture memory 457 to fetch samples used for prediction. After motion compensating the fetched samples in accordance with the symbols 421 pertaining to the block, these samples may be added by the aggregator 455 output from the scaler/inverse transform unit (in this case called the residual samples or residual signal) so as to generate output sample information. The addresses within the reference picture memory form where the motion compensation unit fetches prediction samples may be controlled by motion vectors available to the motion compensation unit in the form of symbols 421 that may have, for example X, Y, and reference picture components. Motion compensation may also include interpolation of sample values as fetched from the reference picture memory when sub-sample exact motion vectors are in use, motion vector prediction mechanisms, and so forth.

The output samples of the aggregator 455 may be subject to various loop filtering techniques in the loop filter unit 454. Video compression technologies may include in-loop filter technologies that are controlled by parameters included in the coded video bitstream and made available to the loop filter unit 454 as symbols 421 from the parser 420, but can also be responsive to meta-information obtained during the decoding of previous (in decoding order) parts of the coded picture or coded video sequence, as well as responsive to previously reconstructed and loop-filtered sample values.

The output of the loop filter unit 454 may be a sample stream that may be output to the display 212 or may be output to the reference picture memory 457 for later use in inter-picture prediction.

Certain coded pictures, once fully reconstructed, may be used as reference pictures for future prediction. Once a coded picture is fully reconstructed and the coded picture has been identified as a reference picture (by, for example, parser 420), the current reference picture 456 may become part of the reference picture buffer 457, and new current picture memory may be reallocated before commencing the reconstruction for the following coded picture.

The video decoder 310 may perform decoding operations according to a predetermined video compression technology or a standard, such as ITU-T Rec. H.265 or H.266. The coded video sequence may conform to a syntax specified by the video compression technology or standard being used, in the sense that it adheres to the syntax of the video compression technology or standard, as specified in the video compression technology or standard and specifically in the profiles document therein. Also necessary for compliance may be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

Figure 5:
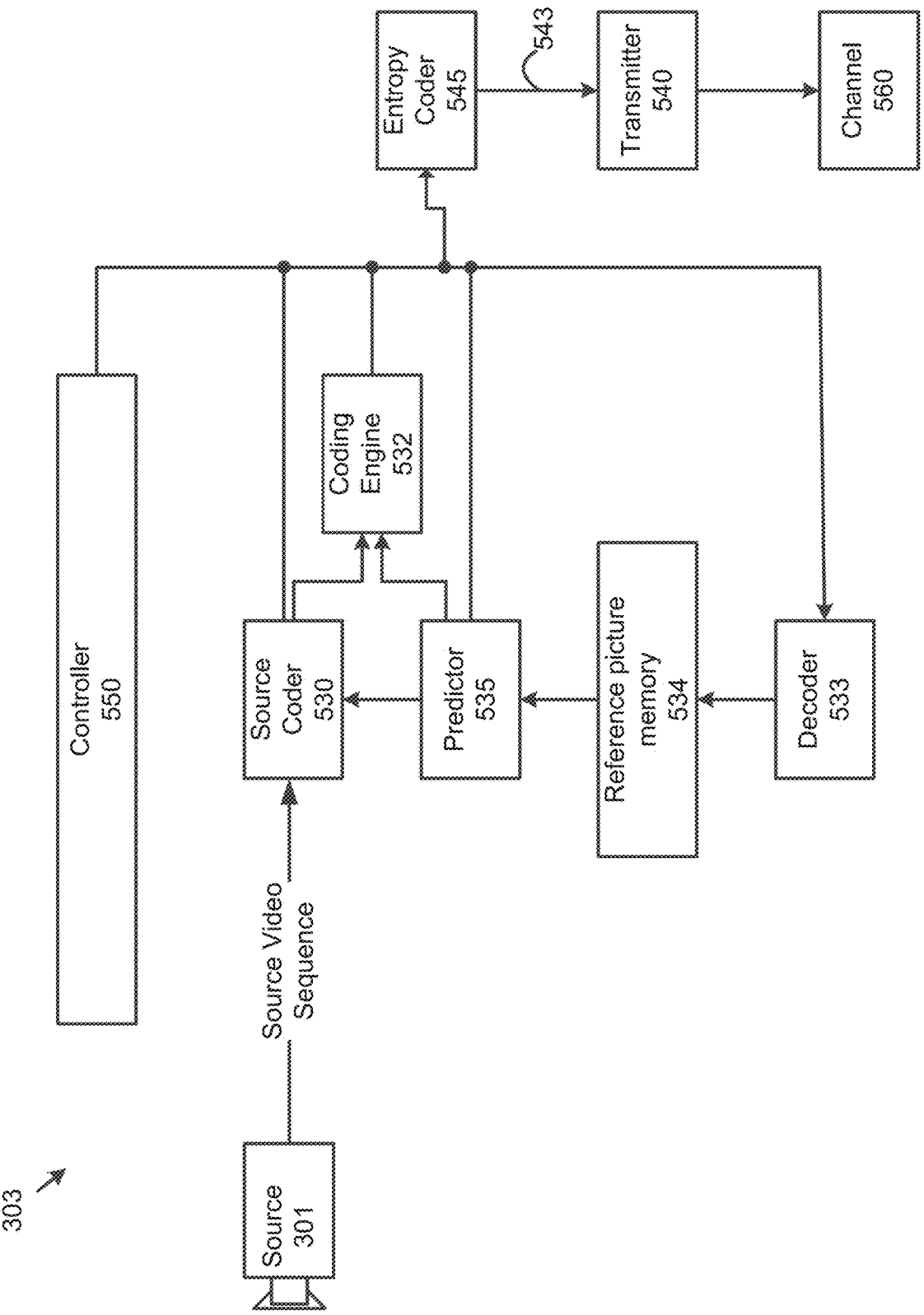
FIG. 5 is a block diagram illustrating a video encoder according to an embodiment.

FIG. 5 is a block diagram illustrating a video encoder according to an embodiment.

An encoder 303 may receive video samples from a video source 301 configured to capture video frames to be coded by the encoder 303. Here, the video source 301 is not part of the encoder. The video source 301 may provide the source video sequence to the encoder 303 in the form of a digital video sample stream that may be of any suitable bit depth (for example: 8 bit, 10 bit, 12 bit, . . . ), any color space (for example, BT.601 Y CrCB and RGB) and any sampling structure (for example, Y CrCb 4:2:0, Y CrCb 4:4:4). In a media serving system, the video source 301 may be a storage device storing previously captured videos. In a videoconferencing system, the video source 301 may be a camera that captures local image information as a video sequence. Video data may be provided as a plurality of pictures or frames that constitute a motion when viewed in sequence. The frames may be organized as a spatial array of pixels, in which each pixel may include one or more samples depending on the sampling structure, color space, etc. A person skilled in the art would readily understand the relationship between pixels and samples.

The encoder 303 may include a controller 550 that controls overall operation of a coding loop. For example, the controller 550 may control coding speed in the coding loop among other functions of the encoder. Specifically, the coding loop may include a source coder 530 and a decoder 533. The source coder 530 may be configured to create symbols based on an input frame to be coded and a reference frame. The decoder 533 may be configured to reconstruct the symbols to create sample data that another decoder in a remote device may decode. The reconstructed sample stream is then input to a reference picture memory 534. As the decoding of a symbol stream leads to bit-exact results independent of decoder location (local or remote), the content of the reference picture memory (or buffer) is also bit exact between local encoder and remote encoder. In other words, the prediction part of an encoder "sees" as reference frame samples exactly the same sample values as a decoder would "see" when using prediction during decoding. The operation of the "local" decoder 533 may be the same as that of the "remote" decoder 310.

The source coder 530 may perform motion compensated predictive coding, in which it codes an input frame predictively with reference to one or more previously-coded frames from the video sequence that were designated as "reference frames." In this manner, the coding engine 532 codes differences between pixel blocks of an input frame and pixel blocks of a reference frame that may be selected as prediction reference to the input frame.

The local video decoder 533 may decode coded video data of frames that may be designated as reference frames, based on symbols created by the source coder 530. Operations of the coding engine 532 may advantageously be lossy processes. When the coded video data is decoded at the remote decoder, the reconstructed video sequence typically may be a replica of the source video sequence with some errors. The local video decoder 533 replicates decoding processes on reference frames that may be performed by the remote video decoder and may cause reconstructed reference frames to be stored in the reference picture memory 534. In this manner, the encoder 303 may store copies of reconstructed reference frames locally that have common content as the reconstructed reference frames that will be obtained by the remote video decoder (absent transmission errors).

The predictor 535 may perform prediction searches for the coding engine 532. That is, for a new frame to be coded, the predictor 535 may search the reference picture memory 534 for sample data (as candidate reference pixel blocks) or certain metadata such as reference picture motion vectors, block shapes, and so on, that may serve as an appropriate prediction reference for the new pictures. The predictor 535 may operate on a sample block-by-pixel block basis to find appropriate prediction references. In some cases, as determined by search results obtained by the predictor 535, an input picture may have prediction references drawn from multiple reference pictures stored in the reference picture memory 534.

Output of all aforementioned functional units may be subjected to entropy coding by an entropy coder 545. The entropy coder may be configured to translate the symbols generated by the various functional units into a coded video sequence, by loss-less compressing the symbols according to technologies known to a person skilled in the art as, for example Huffman coding, variable length coding, arithmetic coding, and the like.

A transmitter 540 may buffer the coded video sequence(s) as created by the entropy coder 545 to prepare for transmission via a communication channel 560, which may be a hardware/software linked to a storage device that may store the encoded video data. The transmitter 540 may merge coded video data from the source coder 530 with other data to be transmitted, for example, coded audio data and/or ancillary data streams. The transmitter 540 may transmit additional data with the encoded video. The source coder 530 may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and the like.

The controller 550 may control overall coding operation of the source coder 530, including, for example, setting parameters and subgroup parameters used for encoding the video data. During coding, the controller 550 may assign to each coded picture a certain coded picture type, which may be applied to the respective pictures. For example, pictures often may be assigned as one of the following frame types:

An Intra Picture (I picture) may be a frame type that may be coded and decoded without using any other frame in the sequence as a source of prediction. Some video codecs allow for different types of Intra pictures, including, for example Independent Decoder Refresh Pictures.

A Predictive picture (P picture) may be a frame type that may be coded and decoded using intra prediction or inter prediction using at most one motion vector and reference index to predict the sample values of each block.

A Bi-directionally Predictive Picture (B Picture) may be a frame type that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or temporal prediction with reference to one or two previously coded reference pictures.

The video encoder 303 may perform coding operations according to a predetermined video coding technology or standard, such as ITU-T Rec. H.265 and H.266 under development. In its operation, the video coder 303 may perform various compression operations, including predictive coding operations that exploit temporal and spatial redundancies in the input video sequence. The coded video data, therefore, may conform to a syntax specified by the video coding technology or standard being used.

Figure 1:
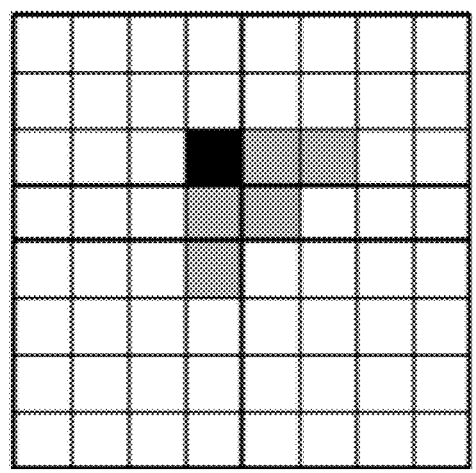
FIG. 1 is a diagram illustrating residual coding for transform coefficients in a local template.
Figure 6:
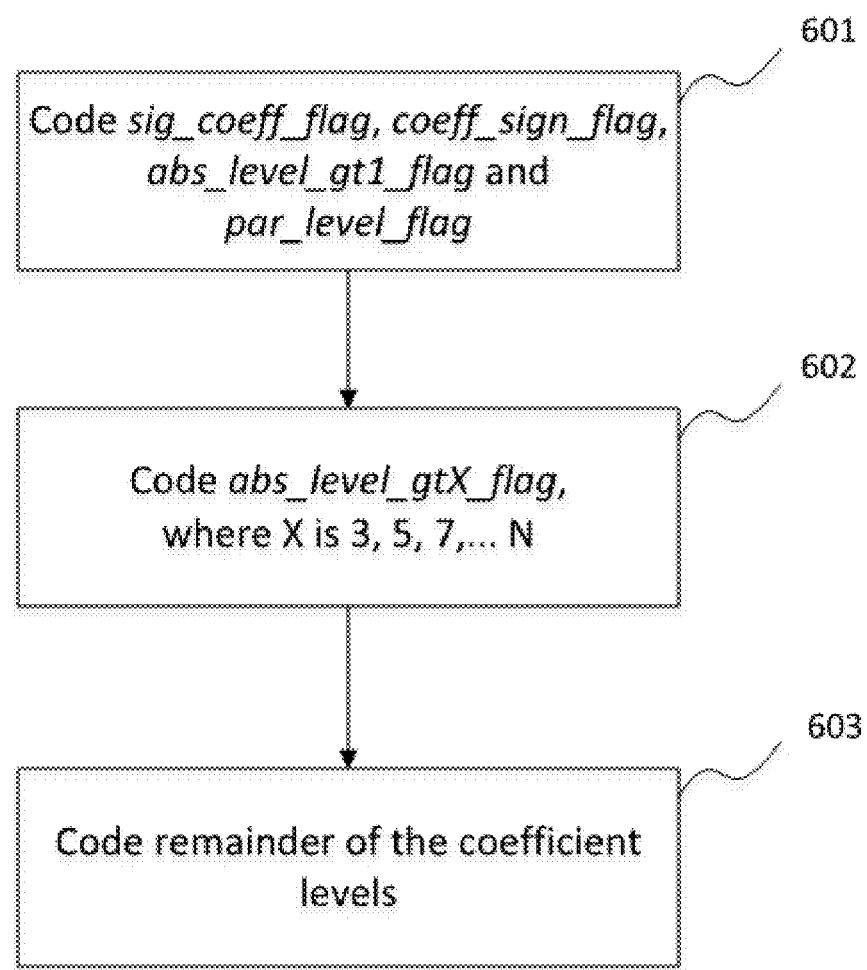
FIG. 6 is a flowchart illustrating a method of residual coding using a Transform Skip Mode (TSM) and a Differential Pulse Code Modulation (DPCM) according to an embodiment.

FIG. 6 is a flowchart illustrating a residual coding using a Transform Skip Mode (TSM) and Differential Pulse Code Modulation (DPCM) according to an embodiment. Here, in order to adapt the residual coding to the statistics and signal characteristics of the TSM and Block DPCM (BDPCM) residual levels, which represent the quantized prediction residual (spatial domain), the above-described residual coding process with respect to FIG. 1 is modified to apply the TSM and BDPCM.

According to an embodiment, there are three coding passes in a residual coding using the TSM and the BDPCM. In the first coding pass, sig_coeff_flag, coeff_sign_flag, abs_level_gt1_flag, par_level_flag are coded in one pass (S601). In the second pass, abs_level_gtX_flag are coded, where X may be 3, 5, 7, . . . N (S602). In the third pass, the remainder of the coefficient levels are coded (S603). The coding pass is operated at a coefficient group (CG) level, that is, for each CG, three coding passes are performed.

In this case, there is no last significant scanning position. Since the residual signal reflects the spatial residual after the prediction, and no energy compaction by transform is performed for transport stream (TS), the higher probability for trailing zeros or insignificant levels at the bottom right corner of the transform block is not given anymore. Thus, last significant scanning position signaling is omitted in this case. Instead, the first subblock to be processed is the most bottom right subblock within the transform block.

However, the absence of the last significant scanning position signaling requires the subblock constant rate factor (CBF) signaling with coded_sub_block_flag for TS to be modified. Due to quantization, the aforementioned sequence of insignificance may still occur locally inside a transform block. Thus, the last significant scanning position is removed as described before and coded_sub_block_flag is coded for all sub-blocks.

The coded_sub_block_flag for the subblock covering the DC frequency position (top-left subblock) presents a special case. In VVC Draft 3, the coded_sub_block_flag for this subblock is never signaled or is always equal to 1. When the last significant scanning position is located in another subblock, it means that there is at least one significant level outside the DC subblock. Consequently, the DC subblock may contain only zero/non-significant levels although the coded_sub_block_flag for this subblock is equal to 1. With the absence of the last scanning position information in TS, the coded_sub_block_flag for each subblock is signaled. This also includes the coded_sub_block_flag for the DC subblock except when all other coded_sub_block_flag syntax elements are already equal to 0. In this case, the DC coded_sub_block_flag is inferred to be equal to 1 (inferDcSbCbf=1). Since there has to be at least one significant level in this DC subblock, the sig_coeff_flag syntax element for the first position at (0,0) is not signaled and derived to be equal to 1 (inferSbDcSigCoeffFlag=1), otherwise, all other sig_coeff_flag syntax elements in this DC subblock are equal to 0.

Furthermore, the context modeling for coded_sub_block_flag may be changed. The context model index may be calculated as the sum of the coded_sub_block_flag to the right and the coded_sub_block_flag below the current subblock instead of and a logical disjunction of both.

For example, in sig_coeff_flag context modelling, the local template in sig_coeff_flag context modeling is modified to only include the neighbor to the right (NB0) and the neighbor below (NB1) the current scanning position. The context model offset is a number of significant neighboring positions sig_coeff_flag[NB0]+sig_coeff_flag[NB1]. Accordingly, the selection of different context sets depending on the diagonal d within the current transform block is removed. This results in three context models and a single context model set for coding the sig_coeff_flag flag.

With respect to abs_level_gt1_flag and par_level_flag context models, a single context model may be employed.

With respect to abs remainder coding, although the empirical distribution of the transform skip residual absolute levels typically still fits a Laplacian or a Geometrical distribution, there exist larger instationarities than for transform coefficient absolute levels. Particularly, the variance within a window of consecutive realization is higher for the residual absolute levels. Therefore, the following modifications of the abs remainder syntax binarization and context modeling may be performed.

According to an embodiment, the abs_remainder coding uses a higher cutoff value in the binarization, i.e., the transition point from the coding with sig_coeff_flag, abs_level_gt1_flag, par_level_flag, and abs_level_gt3_flag to the Rice codes for abs remainder, and dedicated context models for each bin position yields higher compression efficiency. Increasing the cutoff may result in more "greater than X" flags, e.g., introducing abs_level_gt5_flag, abs_level_gt7_flag, and so on until a cutoff is reached. The cutoff itself may be fixed to 5 (e.g., numGtFlags=5).

Also, the template for the rice parameter derivation is modified. That is, only the neighbor to the left and the neighbor below the current scanning position are considered similar to the local template for sig_coeff_flag context modeling.

In coeff_sign_flag context modeling, due to the instationarities inside the sequence of signs and the fact that the prediction residual is often biased, the signs can be coded using context models, even when the global empirical distribution is almost uniformly distributed. A single dedicated context model may be used for the coding of the signs and the sign may be parsed after sig_coeff_flag to keep all context coded bins together.

Furthermore, the total number of context coded bins per TU may be restricted to be the TU area size multiplied by 2, e.g., the maximum number of context coded bins for a 16×8 TU is 16×8×2=256. The budget of context coded bins is consumed at the TU-level, that is, instead of the individual budget of context coded bins per CG, all the CGs inside the current TU may share one budget of context coded bins.

Figure 7A:
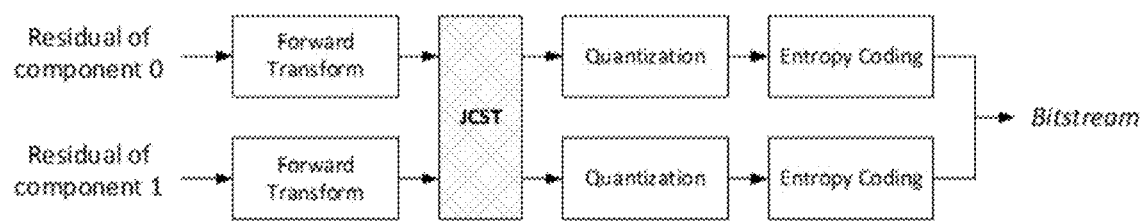
FIG. 7A is a block diagram illustrating an encoder using Joint Component Secondary Transform (JCST) for two color components according to an embodiment.
Figure 7B:
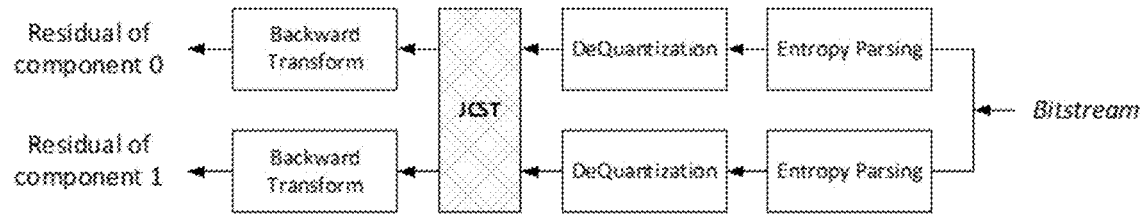
FIG. 7B is a block diagram illustrating a decoder using Joint Component Secondary Transform (JCST) for two color components according to an embodiment.

FIG. 7A is a block diagram illustrating an encoder using Joint Component Secondary Transform (JCST) for two color components according to an embodiment. FIG. 7B is a block diagram illustrating a decoder using Joint Component Secondary Transform (JCST) for two color components according to an embodiment.

In VVC Draft 6, it supports a mode where the chroma residuals are coded jointly. The usage (or activation) of a joint chroma coding mode is indicated by a TU-level flag tu_joint_cbcr_residual_flag and the selected mode is implicitly indicated by the chroma CBFs. The flag tu_joint_cbcr_residual_flag is present if either or both chroma CBFs for a TU are equal to 1.

In Picture Parameter Set (PPS) and slice header, chroma QP offset values are signalled for the joint chroma residual coding mode to differentiate from the chroma QP offset values signalled for regular chroma residual coding mode. These chroma QP offset values are used to derive the chroma QP values for those blocks coded using the joint chroma residual coding mode.

For example, Table 1 below shows reconstruction process of chroma residuals (resCb and resCr) from the transmitted transform blocks, where the value of CSign is a sign value (+1 or −1), which may be specified in the slice header, and resJointC is a transmitted residual.

TABLE 1

| tu_cbf_cb | tu_cbf_cr | reconstruction of Cb and Cr residuals | mode |
|---|---|---|---|
| 1 | 0 | resCb[x][y] = resJointC[x][y]<br>resCr[x][y] = (CSign * resJointC[x][y]) >> 1 | 1 |
| 1 | 1 | resCb[x][y] = resJointC[x][y]<br>resCr[x][y] = CSign * resJointC[x][y] | 2 |
| 0 | 1 | resCb[x][y] = (CSign * resJointC[x][y]) >> 1<br>resCr[x][y] = resJointC[x][y] | 3 |

When a corresponding joint chroma coding mode (mode 2 in Table 1) is active in a TU, this chroma QP offset is added to the applied luma-derived chroma QP during quantization and decoding of that TU. For the other modes (modes 1 and 3 in Table 1), the chroma QPs are derived in the same way as for conventional Cb or Cr blocks. When this mode is activated, one single joint chroma residual block (resJointC [x] [y] in Table 1) is signaled, and residual block for Cb (resCb) and residual block for Cr (resCr) are derived considering information such as tu_cbf_cb, tu_cbf_cr, and CSign, which is a sign value specified in the slice header. The three joint chroma coding modes described above are only supported in intra coded CU. In inter-coded CU, only mode 2 is supported. Hence, for inter coded CU, the syntax element tu_joint_cbcr_residual_flag is only present if both chroma cbfs are 1.

In an embodiment, a method of performing a joint component secondary transform (JCST) is provided. Here, a secondary transform is performed jointly on the transform coefficients of multiple color components, e.g., Cb and Cr color components. Referring to FIG. 7A, an encoder scheme uses JCST for two color components, where JCST is performed after forward transform and before quantization. Here, residual of component 0 and residual of component 1 are input to be forward transformed. For example, the residual components 0 and 1 may be Cb and Cr transform coefficients. As another example, the residual components 0 and 1 may be Y, Cb and Cr transform coefficients. The joint secondary transform may be performed elementwise on the forward transformed residual component 0 and residual component 1, which means that JCST is performed for each pair of Cb and Cr transform coefficients that are located at the same coordinate. Then, the secondary transformed residual components are respectively quantized and entropy coded to result in a bitstream.

Referring to FIG. 7B, a decoder scheme uses JCST, where JCST is performed after dequantization transform and before backward (or inverse) transform. Here, when the encoded bitstream is received, the decoder performs parsing on the received bitstream to separate transform coefficients for two color components and dequantizes respective color components. The dequantized color components are then performed the JCST and backward transform on the respective color components to result in residual of component 0 and residual of component 1.

However, in the transform domain, especially for chroma components, the energy transform coefficients typically concentrate at low frequencies. Therefore, when performing JCST, which is applied in the transform domain, it may not be necessary to apply JCST on all the frequencies to capture the coding gain of JCST.

Figure 8:
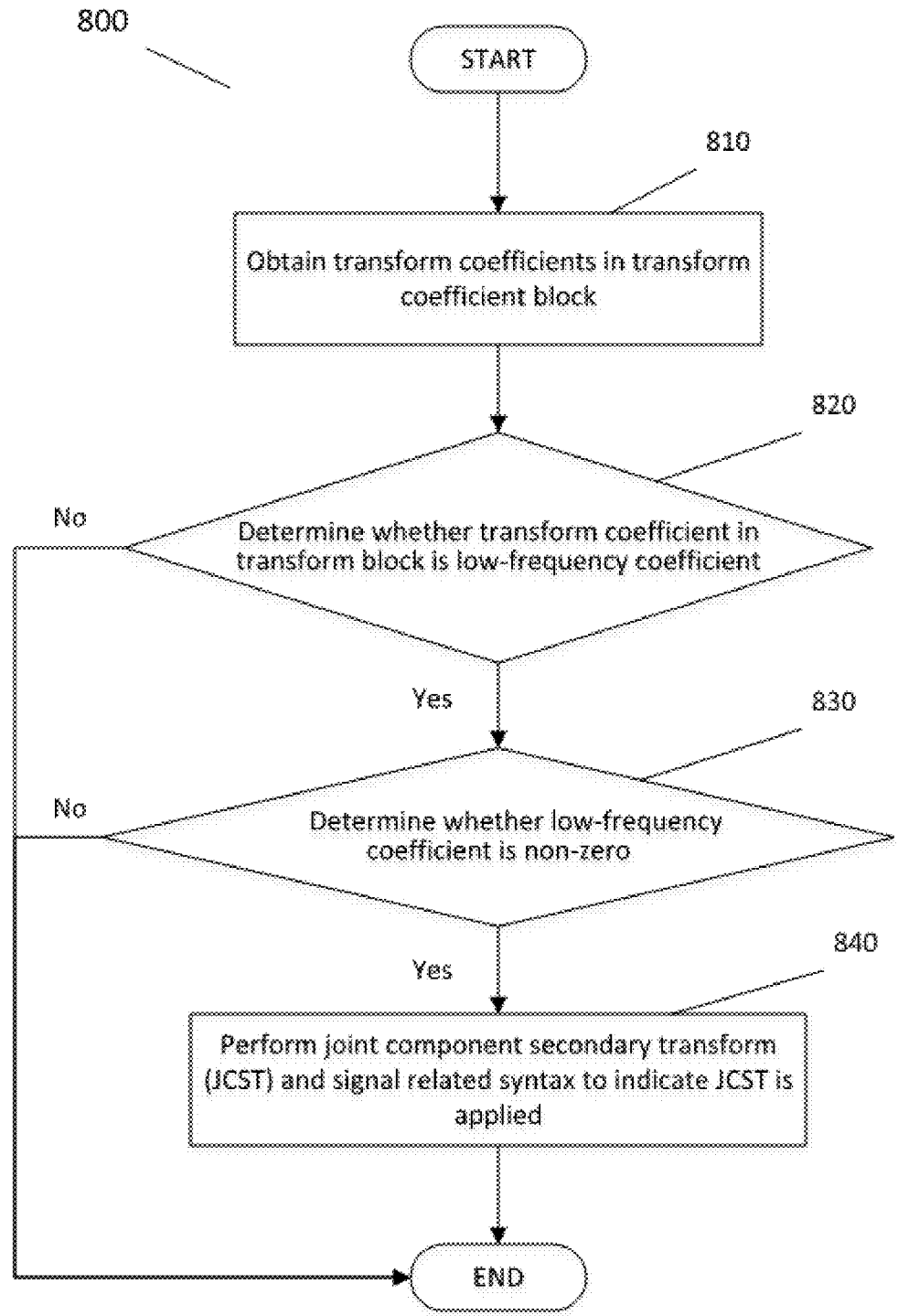
FIG. 8 is a flowchart illustrating a method of applying frequency-dependent joint component secondary transform (FD-JCST) according to an embodiment.

FIG. 8 is a flowchart illustrating a method of applying frequency-dependent joint component secondary transform (FD-JCST) according to an embodiment. In some implementations, one or more process blocks of FIG. 8 may be performed by the encoder 303. In some implementations, one or more process blocks of FIG. 8 may be performed by another device or a group of devices separate from or including the encoder 303, such as decoder 310.

According to an embodiment, when performing the residual coding using JCST, a frequency-dependent joint component secondary transform (FD-JCST) may be applied on the transform coefficients of multiple color components. That is, the transform kernel used in JCST depends on the relative coordinate of the transform coefficients in the transform coefficient blocks, i.e., the frequency in the transform domain. In an embodiment, different kernels may be applied for DC coefficient and AC coefficient. Here, DC coefficient may refer to the coefficient located at the top-left (lowest frequency) position of the transform coefficient block and AC coefficient may refer to any other coefficients that are not DC coefficient in the transform coefficient block.

Referring to FIG. 8, the method 800 includes obtaining transform coefficients in transform coefficient block (S810).

Based on the obtained transform coefficients in S810, the method 800 includes determining whether the transform coefficient in transform block is low-frequency coefficient. According to an embodiment, the low-frequency coefficient may be determined based on the coordinate (x, y) in the transform coefficient block, where both x and y are smaller than or equal to a given threshold N (for example, where N is equal to 1, 2, 3, 4, 5, 7, 8, . . . , 16, . . . , and 32). In another embodiment, the low-frequency coefficient may be determined based on the first N coefficients in a scanning order (for example, where N is equal to 1, 2, 3, 4, 5, 7, 8, . . . , 16, . . . , 32, . . . , 64, . . . , 128, . . . , and 256). In another embodiment, the low-frequency coefficient may be determined based on the coordinate (x, y) in the transform coefficient block, where either x or y is smaller than or equal to a given threshold N (for example, where N is equal to 1, 2, 3, 4, 5, 7, 8, . . . , 16, . . . , 32). In another embodiment, the low-frequency coefficient may be determined based on the coordinate (x, y) in the transform coefficient, where the maximum (or minimum) between x and y is smaller than or equal to a given threshold N (for example, where N is equal to 1, 2, 3, 4, 5, 7, 8, . . . , 16, . . . , 32). However, the embodiment is not limited thereto, but may include other values for N.

Based on the transform coefficient being low-frequency coefficient (S820: Yes), the method 800 includes determining whether the low-frequency coefficient is a non-zero value. If the low-frequency coefficient is non-zero (S830: Yes), the method includes performing joint component secondary transform (JCST) on the transform coefficient and signaling any related syntax to indicate that JCST is being applied (S840). Alternatively, if the low-frequency coefficient is zero (S830: No), the JCST is not applied and does not signal the related syntax.

According to an embodiment, the related syntax may be a high-level syntax (HLS). Accordingly, the method 800 may include signaling the transform kernels used in JC ST at high-level syntax (HLS). For example, if a transform kernel is a 2×2 matrix, only one element of the kernel is signaled, and all other elements are derived based on the orthogonality and pre-defined norm of the transform kernel.

According to another embodiment, instead of signaling the kernel element, a group of fixed transform kernels may be pre-defined, and an index to the transform kernel that is being used in the group may be signaled in the HLS.

Furthermore, the HLS may indicate a kernel used for each frequency, a kernel used for each prediction mode, and/or a kernel used for each associated primary transform type.

In addition, the method 800 may apply an integer transform kernel for JCST. Here, an integer kernel may mean that a transform kernel includes all elements as integers.

Based on applying an integer transform kernel for JCST, the method 800 may further include dividing an output of JCST by a factor of N, where N may be a power of 2. Alternatively, an output of JCST may be clipped by a given data range, such as [a, b]. For example, values of [a, b] may include $[-2^{15}, 2^{15}-1]$, or $[-2^M, 2^M-1]$, where M depends on the internal bit depth.

Although FIG. 8 shows example blocks of the method 800, in some implementations, the method 800 may include additional blocks, fewer blocks, different blocks, or differently arranged blocks than those depicted in FIG. 8. Additionally, or alternatively, two or more of the blocks of the method 800 may be performed simultaneously or in parallel.

Further, the method 800 may be implemented by a processing circuitry (e.g., one or more processors or one or more integrated circuits). In an example, the one nor more processors may execute a program that is stored in a non-transitory computer-readable medium to perform one or more of the methods.

Figure 9:
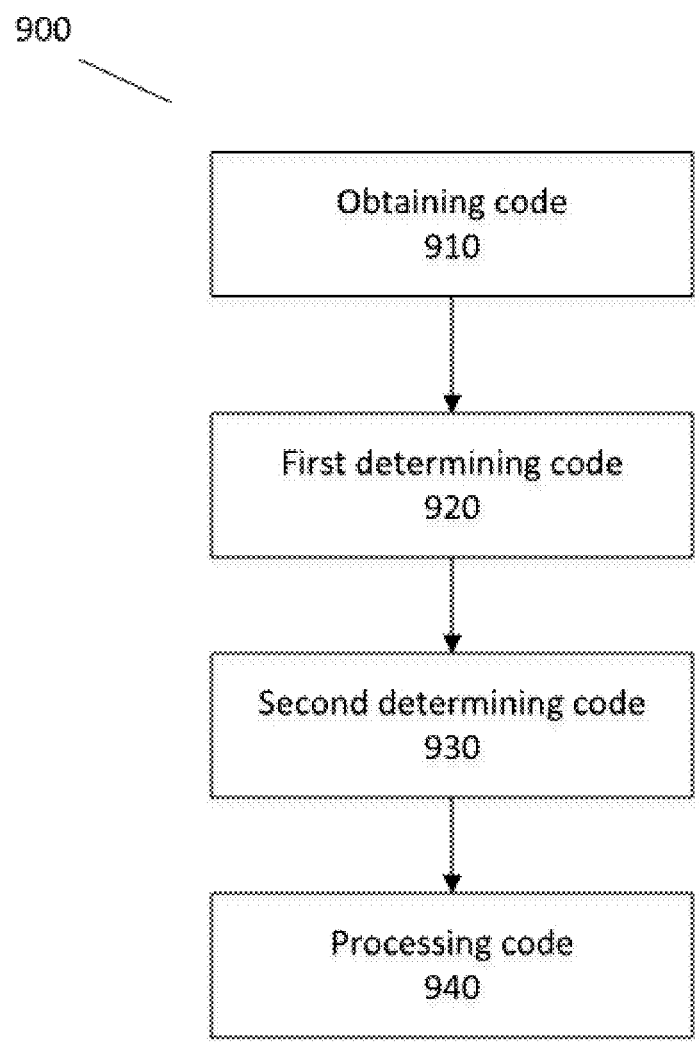
FIG. 9 is a structural diagram illustrating an apparatus configured to apply FD-JCST according to an embodiment.

FIG. 9 is a simplified block diagram of an apparatus 900 for applying frequency-dependent joint component secondary transform (FD-JCST) according to an embodiment.

The apparatus 900 may include obtaining code 910, first determining code 920, second determining code 930 and processing code 940.

The obtaining code 910 may be configured to cause the at least one processor to obtain transform coefficients in a transform coefficient block.

The first determining code 920 may be configured to cause the at least one processor to determine whether the transform coefficient in the transform coefficient block is a low-frequency coefficient. As described above with respect to the method 800, the first determining code may determine whether the transform coefficient is a low-frequency coefficient based on various embodiments.

The second determining code 930 may be configured to cause the at least one processor to, based on determining that the transform coefficient in the transform coefficient block is low-frequency coefficient, determine whether the low-frequency coefficient has a non-zero value.

The processing code 940 may be configured to cause the at least one processor to, based on determining that the low-frequency coefficient has a non-zero value, perform joint component secondary transform on the low-frequency coefficient and signal related syntax to indicate that the JCST is being applied.

The related syntax may be a high-level syntax (HLS).

The processing code 940 may be further configured to signal transform kernels used in JCST at high-level syntax (HLS). For example, if a transform kernel is a 2×2 matrix, only one element of the kernel is signaled, and all other elements are derived based on the orthogonality and pre-defined norm of the transform kernel.

Alternatively, the processing code 940 may be configured to, instead of signaling the kernel element, signal a group of fixed transform kernels that are pre-defined, and signal an index to the transform kernel that is being used in the group, in the HLS.

The HLS may indicate a kernel used for each frequency, a kernel used for each prediction mode, and/or a kernel used for each associated primary transform type.

Furthermore, the processing code 940 may be configured to cause the at least one processor to apply an integer transform kernel for JCST. Here, an integer kernel may mean that a transform kernel includes all elements as integers.

Based on applying an integer transform kernel for JCST, the processing code 940 may be configured to divide an output of JCST by a factor of N, where N may be a power of 2. Alternatively, an output of JCST may be clipped by a given data range, such as [a, b]. For example, values of [a, b] may include [−215, 215−1], or [−2M, 2M−1], where M depends on the internal bit depth.

The embodiments described above may be implemented as computer software using computer-readable instructions and physically stored in one or more computer-readable media.

Figure 10:
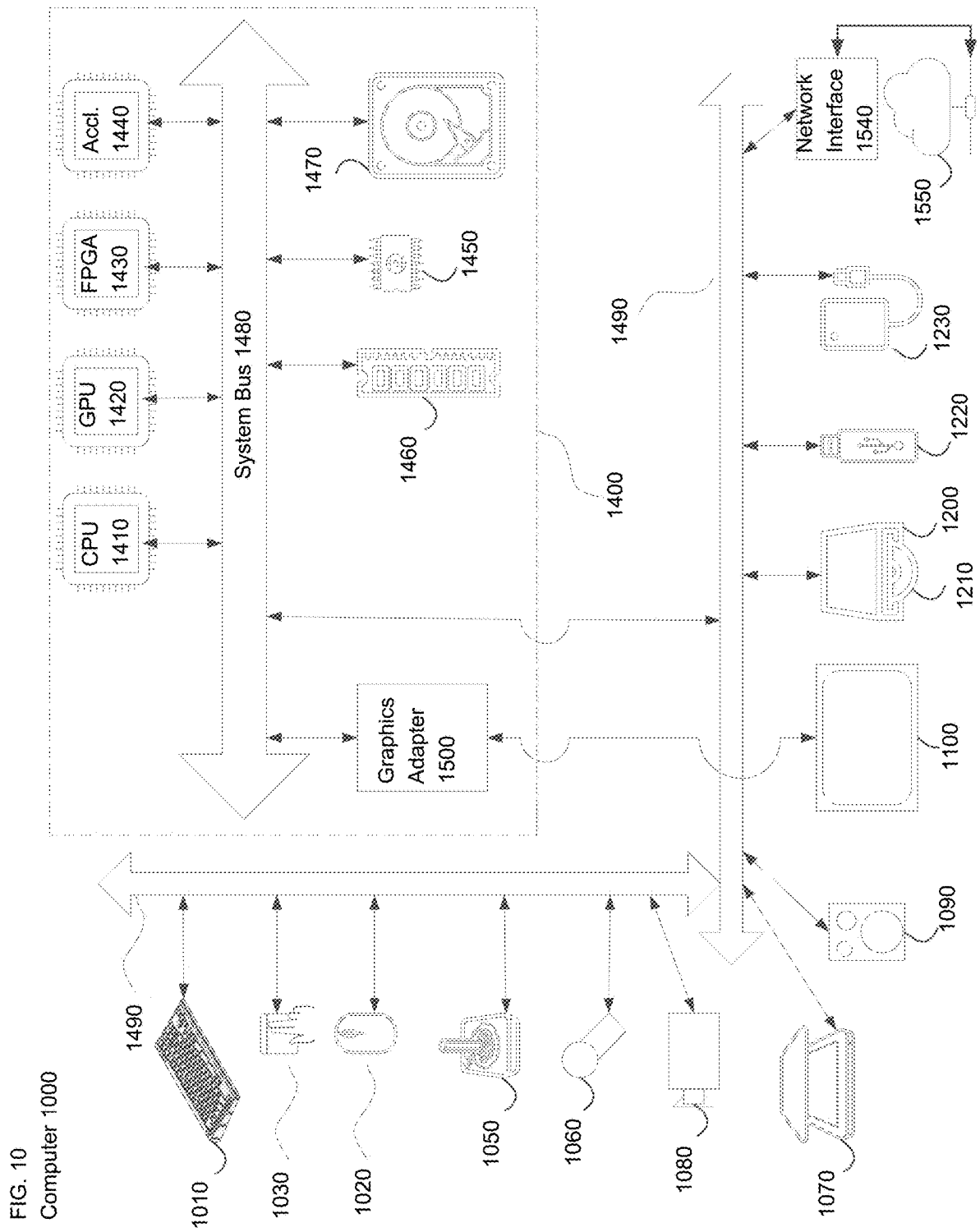
FIG. 10 is a structural diagram of a computer suitable for implementing embodiments.

FIG. 10 is a structural diagram of a computer 1000 suitable for implementing the embodiments.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

The components shown in FIG. 10 for computer system 1000 are exemplary in nature and are not intended to suggest any limitation as to the scope of use or functionality of the computer software implementing embodiments. Neither should the configuration of components be interpreted as having any dependency or requirement relating to any one or combination of components illustrated in the exemplary embodiment of a computer system 1000.

Computer system 1000 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input. The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 1010, mouse 1020, trackpad 1030, touch screen 1100, data-glove 1040, joystick 1050, microphone 1060, scanner 1070, camera 1080.

Computer system 1000 may also include certain human interface output devices. Such human interface output devices may be stimulating the senses of one or more human users through, for example, tactile output, sound, light, and smell/taste. Such human interface output devices may include tactile output devices (e.g., tactile feedback by the touch-screen 1100, data-glove 1040, or joystick 1050, but there can also be tactile feedback devices that do not serve as input devices), audio output devices (e.g., speakers 1090 and headphones), visual output devices (such as screens 1100 to include cathode ray tube (CRT) screens, liquid-crystal display (LCD) screens, plasma screens, organic light-emitting diode (OLED) screens, each with or without touch-screen input capability, each with or without tactile feedback capability—some of which may be capable to output two dimensional visual output or more than three dimensional output through means such as stereographic output; virtual-reality glasses, holographic displays and smoke tanks, and printers.

Computer system 1000 can also include human accessible storage devices and their associated media such as optical media including CD/DVD ROM/RW 1200 with CD/DVD or the like media 1210, thumb-drive 1220, removable hard drive or solid state drive 1230, legacy magnetic media such as tape and floppy disc, specialized ROM/ASIC/PLD based devices such as security dongles, and the like.

Those skilled in the art should also understand that term "computer readable media" as used in connection with the embodiments of the disclosure does not encompass transmission media, carrier waves, or other transitory signals.

The computer system 1000 may also include interface(s) to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include global systems for mobile communications (GSM), third generation (3G), fourth generation (4G), fifth generation (5G), Long-Term Evolution (LTE), and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1490) (e.g., universal serial bus (USB) ports of the computer system 1000; others are commonly integrated into the core of the computer system 1000 by attachment to a system bus as described below (for example Ethernet interface into a PC computer system or cellular network interface into a smartphone computer system). Using any of these networks, computer system 1000 can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks may be used on each of those networks and network interfaces as described above.

Aforementioned human interface devices, human-accessible storage devices, and network interfaces may be attached to a core 1400 of the computer system 1000.

The core 1400 may include one or more Central Processing Units (CPU) 1410, Graphics Processing Units (GPU) 1420, specialized programmable processing units in the form of Field Programmable Gate Areas (FPGA) 1430, hardware accelerators 1440 for certain tasks, and so forth. These devices, along with Read-only memory (ROM) 1450, Random-access memory (RAM) 1460, internal mass storage such as internal non-user accessible hard drives, solid-state drives (SSDs), and the like 1470, may be connected through a system bus 1480. In some computer systems, the system bus 1480 can be accessible in the form of one or more physical plugs to enable extensions by additional CPUs, GPU, and the like. The peripheral devices can be attached either directly to the core's system bus 1480, or through a peripheral bus 1490. Architectures for a peripheral bus include peripheral component interconnect (PCI), USB, and the like.

CPUs 1410, GPUs 1420, FPGAs 1430, and accelerators 1440 can execute certain instructions that, in combination, can make up the aforementioned computer code. That computer code can be stored in ROM 1450 or RAM 1460. Transitional data can also be stored in RAM 1460, whereas permanent data can be stored for example, in the internal mass storage 1470. Fast storage and retrieve to any of the memory devices can be enabled through the use of cache memory, that can be closely associated with one or more CPU 1410, GPU 1420, mass storage 1470, ROM 1450, RAM 1460, and the like.

The computer readable media can have computer code thereon for performing various computer-implemented operations. The media and computer code can be those specially designed and constructed for the purposes of embodiments, or they can be of the kind well known and available to those having skill in the computer software arts.

As an example and not by way of limitation, the computer system having architecture 1000, and specifically the core 1400 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 1400 that are of non-transitory nature, such as core-internal mass storage 1470 or ROM 1450. The software implementing various embodiments can be stored in such devices and executed by core 1400. A computer-readable medium can include one or more memory devices or chips, according to particular needs. The software can cause the core 1400 and specifically the processors therein (including CPU, GPU, FPGA, and the like) to execute particular processes or particular parts of particular processes described herein, including defining data structures stored in RAM 1460 and modifying such data structures according to the processes defined by the software. In addition or as an alternative, the computer system can provide functionality as a result of logic hardwired or otherwise embodied in a circuit (for example: accelerator 1440), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. Embodiments encompass any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof

What is claimed is:

1. A method of performing a joint component secondary transform (JCST), the method comprising:
   obtaining a plurality of transform coefficients of multiple color components and residual components among the plurality of transform coefficients;
   performing a forward transformation on the residual components;
   performing the JCST on the forward transformed residual components; and
   quantizing and entropy coding the residual components to obtain a bitstream.

2. The method of claim 1, wherein the residual components comprise a residual component of 0 and a residual component of 1 that are Cb and Cr transform coefficients, respectively.

3. The method of claim 2, wherein the performing the JCST comprises performing the JCST element-wise on the residual component of 0 and the residual component of 1.

4. The method of claim 1, further comprising:
   determining whether at least one of the plurality of transform coefficients is a low-frequency coefficient;
   based on determining that the at least one of the plurality of transform coefficients is the low-frequency coefficient, determining whether the low-frequency coefficient has a non-zero value; and
   based on determining that the low-frequency coefficient has the non-zero value, performing the JCST on the low-frequency coefficient.

5. The method of claim 4, wherein the determining whether the at least one of the plurality of transform coefficients is the low-frequency coefficient comprises determining whether the at least one of the plurality of transform coefficients is the low-frequency coefficient based on a coordinate (x, y) of a transform coefficient block including the plurality of transform coefficients.

6. The method of claim 1, further comprising signaling a related syntax to indicate that the JCST is performed.

7. The method of claim 6, wherein the related syntax comprises a high level syntax (HLS), and
   wherein the signaling the related syntax further comprises signaling a transform kernel that is used in performing the JCST at the HLS.

8. The method of claim 7, wherein the HLS indicates at least one of the transform kernel used for each frequency of the plurality of transform coefficients, the transform kernel used for each prediction mode, or the transform kernel used for each transform type.

9. The method of claim 4, wherein an output of the JCST is divided by a factor of N, where N is a power of 2, or
   wherein the output of the JCST is clipped in a predetermined data range.

10. An apparatus for performing a joint component secondary transform (JCST) comprising:
    at least one memory storing computer program code; and
    at least one processor configured to access the at least one memory and operate as instructed by the computer program code, and the at least one processor is configured to:
    obtain a plurality of transform coefficients of multiple color components and residual components among the plurality of transform coefficients;
    perform a forward transformation on the residual components;
    perform the JCST on the forward transformed residual components; and
    perform quantization and entropy coding on the residual components to obtain a bitstream.

11. The apparatus of claim 10, wherein the residual components comprise a residual component of 0 and a residual component of 1 that are Cb and Cr transform coefficients, respectively.

12. The apparatus of claim 11, wherein the at least one processor is further configured to perform the JCST element-wise on the residual component of 0 and the residual component of 1.

13. The apparatus of claim 10, wherein the at least one processor is further configured to:
    determine whether at least one of the plurality of transform coefficients is a low-frequency coefficient;
    based on determining that the at least one of the plurality of transform coefficients is the low-frequency coefficient, determine whether the low-frequency coefficient has a non-zero value; and
    based on determining that the low-frequency coefficient has the non-zero value, perform the JCST on the low-frequency coefficient.

14. The apparatus of claim 13, wherein the at least one processor is further configured to:
    determine whether the at least one of the plurality of transform coefficients is the low-frequency coefficient based on a coordinate (x, y) of a transform coefficient block including the plurality of transform coefficients.

15. The apparatus of claim 10, wherein the at least one processor is further configured to signal a related syntax to indicate that the JCST is performed.

16. The apparatus of claim 15, wherein the related syntax comprises a high level syntax (HLS), and
    wherein the at least one processor is further configured to signal a transform kernel that is used in performing the JCST at the HLS.

17. The apparatus of claim 16, wherein the HLS indicates at least one of the transform kernel used for each frequency of the plurality of transform coefficients, the transform kernel used for each prediction mode, or the transform kernel used for each transform type.

18. The apparatus of claim 13, wherein an output of the JCST is divided by a factor of N, where N is a power of 2, or
    wherein the output of the JCST is clipped in a predetermined data range.

19. A non-transitory computer-readable recording medium storing computer program code, the computer program code when executed by at least one processor, causes the at least one processor to:

obtain a plurality of transform coefficients of multiple color components and residual components among the plurality of transform coefficients;

perform a forward transformation on the residual components;

perform the JCST on the forward transformed residual components; and perform quantization and entropy coding on the residual components to obtain a bitstream.

20. The non-transitory computer-readable recording medium of claim 19, wherein the at least one processor is further configured to:

determine whether at least one of the plurality of transform coefficients is a low-frequency coefficient;

based on determining that the at least one of the plurality of transform coefficients is the low-frequency coefficient, determine whether the low-frequency coefficient has a non-zero value; and based on determining that the low-frequency coefficient has the non-zero value, perform the JCST on the low-frequency coefficient.

\* \* \* \* \*